May 19, 1936. V. P. McVOY 2,040,865
ENGINE
Filed Nov. 28, 1934  5 Sheets-Sheet 1

Inventor
Vincen P. McVoy,
By E. W. Bond
Attorney

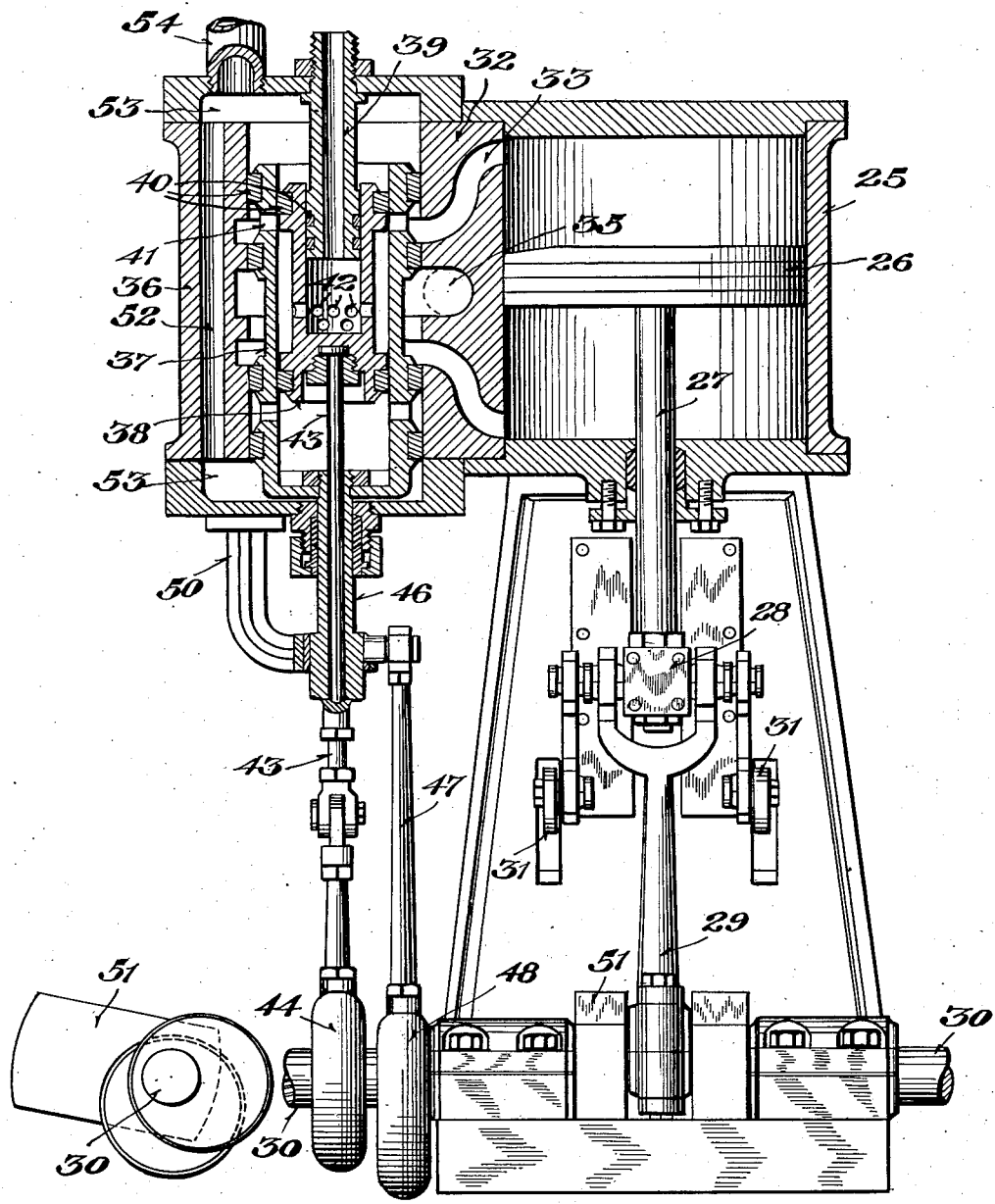

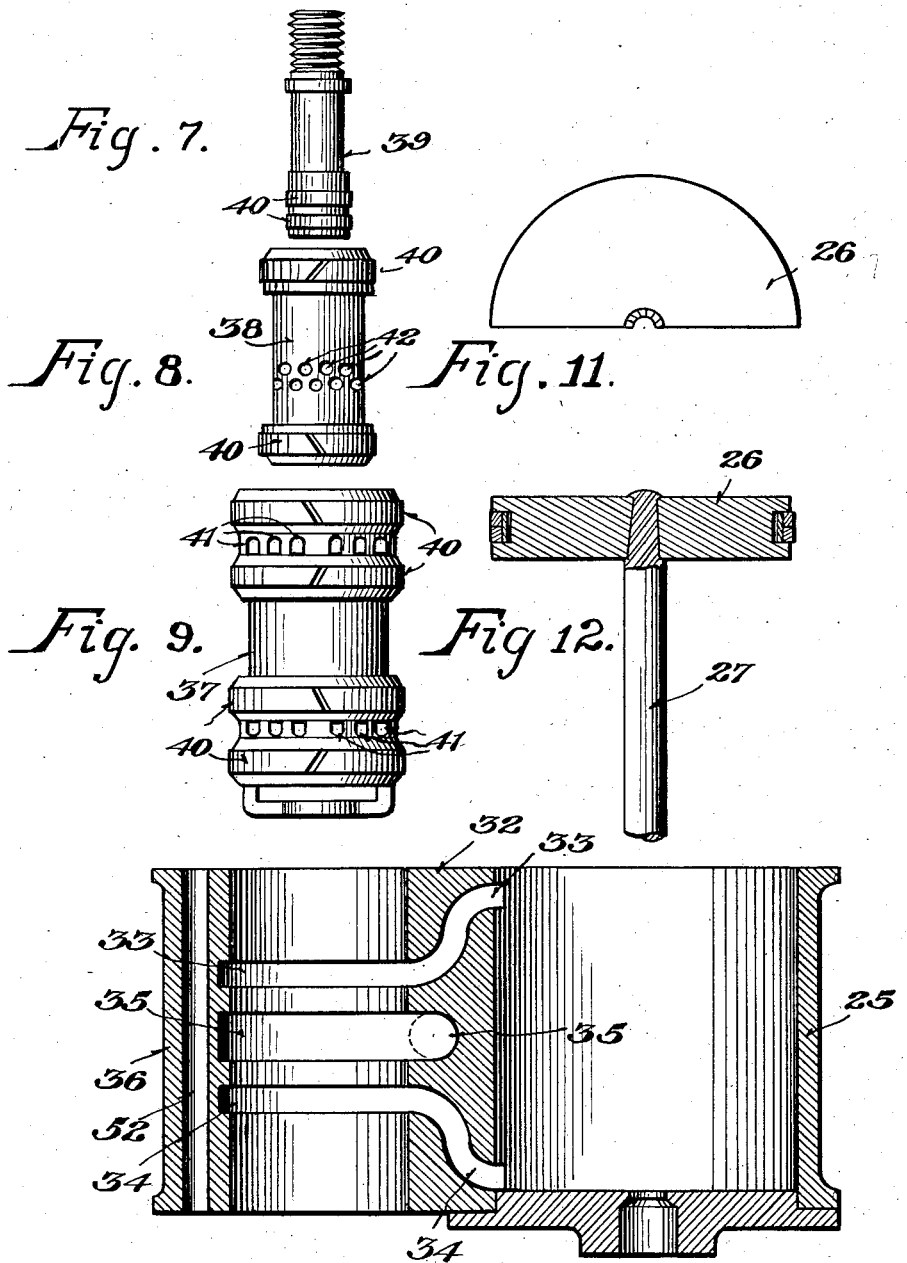

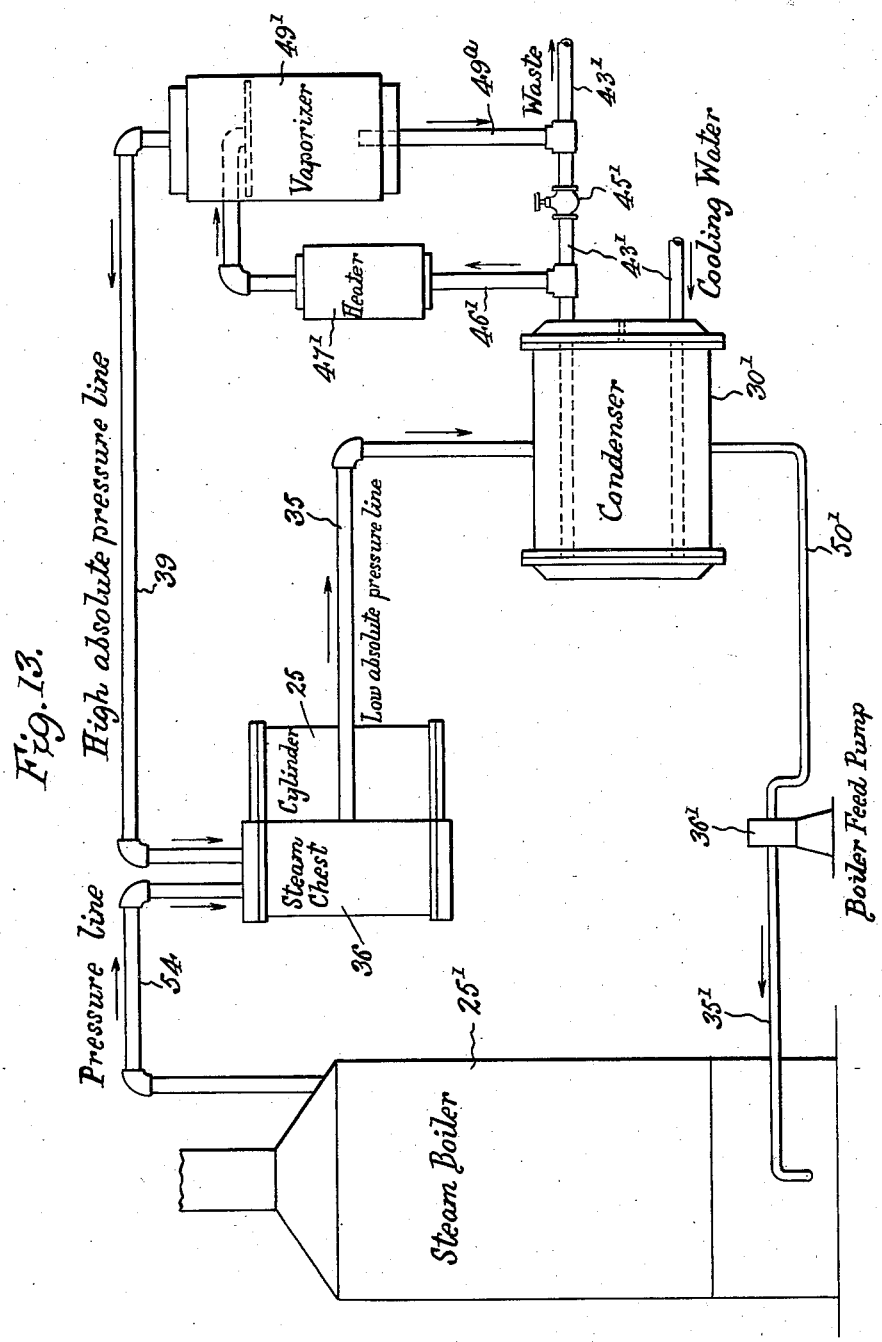

Patented May 19, 1936

2,040,865

UNITED STATES PATENT OFFICE 2,040,865

ENGINE

Vincen P. McVoy, Mobile, Ala., assignor to McVoy Engine Boiler Development Co., Inc., Mobile, Ala., a corporation of Alabama Application November 28, 1934, Serial No. 755,237

8 Claims. (Cl. 121—146)

The present invention relates to engines, and has for an object to provide an engine of the general type of steam reciprocating engines but which has a modified valve system and has main and supplemental intakes cooperating with the valve structure for the efficient operation of the engine when the exhaust thereof is subjected to a relatively low absolute pressure.

Another object of the present invention is to provide a structure of engine of this type which may have its piston, either single or in multiple, of desired diameter proportionate to the work to be performed so that a relatively high horse power may be obtained by a relatively low consumption of fuel.

The invention also has for an object to provide an engine of this character which is supplied with a relatively small volume of steam admitted to the high pressure side of the piston and which by operation of the piston, due to the relatively low absolute back pressure at the exhaust side of the piston, causes expansion of the steam and movement of the piston on the high pressure side to a point where, if continued movement were maintained a vacuum would be created on the pressure side of the piston, which is of lower absolute pressure than the back pressure on the piston, and thereby stall the engine. In order to prevent this there is provided an additional pressure from a separate source to prevent the creation of said vacuum which may stall the engine. This second pressure is, relative to absolute pressure, greater than the back pressure on the piston and less than the pressure originally supplied to the piston.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical sectional view taken through an engine constructed according to the present invention showing the valves and other parts of the engine in its initial position ready for a down stroke of the piston.

Figure 5 is a vertical section similar to Figures 1 and 3 but with the piston advanced toward the intermediate portion of the cylinder and with the valves correspondingly shifted to open the supplemental intake of the engine to the corresponding intake port of the cylinder.

Figure 6 is a transverse section taken through the crank shaft showing in detail the further advanced positions of the crank and the eccentrics corresponding to Figure 5.

Figure 7 is a detail side elevation of the inner stationary valve piston.

Figure 8 is a detail side elevation of the intermediate piston, showing the intermediate openings therethrough.

Figure 9 is a detail side elevation of the outer or larger piston, showing the spaced pairs of rings at opposite ends thereof and the rows of openings intermediate the pairs of rings.

Figure 10 is a detail enlarged section of the cylinder and steam chest block.

Figure 11 is a detail partial plan view of the piston.

Figure 12 is a detail sectional view taken through the piston and rod connected thereto, and Figure 13 is a diagrammatic view of a power system in which the improved engine may be used.

Figures 1, 2:
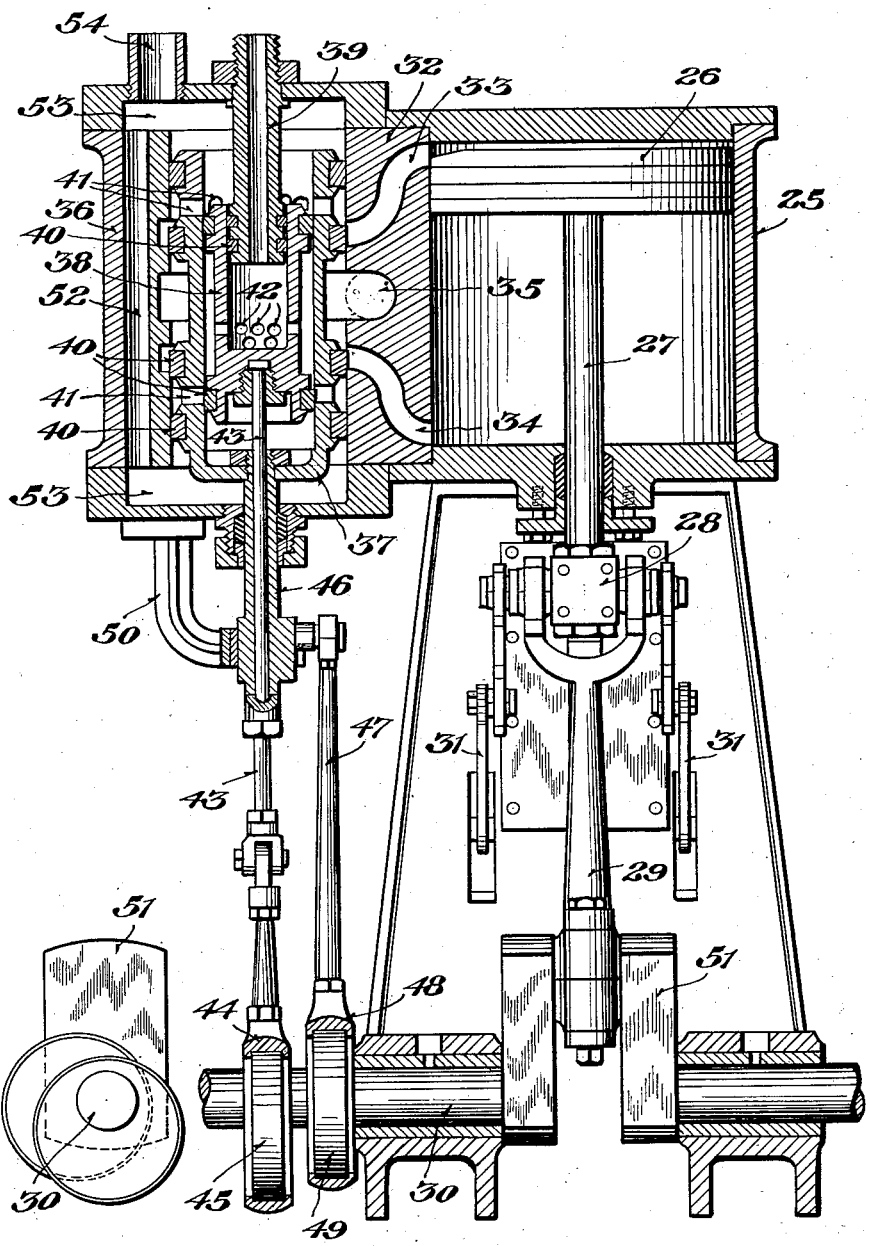
Figure 2 is a detail transverse section taken through the crank shaft showing the relative positions of the crank and the eccentrics on the shaft.

Referring to the drawings, and first to Figure 1, 25 indicates a cylinder having a piston 26 therein. The piston has a rod 27 packed through the bottom of the cylinder and connected by a cross head 28 to a connecting rod 29 for a crank shaft 30. The cross head 28 may be provided with beam connections 31 for driving an attached air pump or other device, as shown in my copending application Serial No. 755,236, filed November 28, 1934.

At one side, the cylinder 25 has a port block 32 having opposite end ports 33 and 34 therein which open through the outer side of the block 32. Between the outer ends of the ports 33 and 34 is an outlet or exhaust port 35 which leads to a source of a relatively low absolute pressure, such as about one pound absolute pressure obtained from the condenser 30' shown in the diagram of Figure 13. A steam chest 36 is secured against the block 32 and is provided therein with a pair of slidably interfitting valve pistons 37 and 38. A third valve piston 39 is fixed to the upper end of the steam chest 36 and engages in the bore of the intermediate slidable valve piston 38.

As shown more particularly in Figures 7, 8 and 9, each one of the valve pistons 37, 38 and 39 are provided with packing rings 40 advantageously mounted therein to seal the valves 37, 38 and 39 in the steam chest 36 and consecutively within one another. The outer valve 37 has near each end an annular row of openings 41 therein located with packing rings 40 at opposite sides of each row of the openings. The intermediate valve 38 has a plurality of openings 42 therein slightly below the central portion of the valve and both of the valve pistons are open at their upper ends while the lower end of the outer valve 37 is also open. The intermediate valve 38 is shorter than the outer valve 37 and is adapted to be shifted therein while the inner piston valve 39 is stationary and engages in the upper end only of the intermediate valve 38.

The intermediate valve 38 has a valve rod 43 which passes downwardly through the steam chest 36 and is connected by an eccentric strap 44 to the eccentric disc 45 on the crank shaft 30. The outer valve piston 37 has a sleeve 46 extending about the rod 43 and is attached to an eccentric rod 47 which has a strap 48 engaging an eccentric disc 49 on the crank shaft 30. A guide 50 may be mounted on the lower end of the steam chest 36 for the sleeve 46 and the rod 43.

As shown in Figure 10 the intake and exhaust ports 33, 34 and 35 are carried annularly about the inner wall of the steam chest 36 so as to surround the valves in the chest 36. The crank shaft 30 has a crank 51.

The inner valve 39 is hollow to provide a supplemental intake passage into the steam chest 36, while the outer wall of the steam chest 36 has a longitudinal passage 52 interconnecting the opposite end steam chambers 53 of the chest 36. The upper head of the chest 36 has a main steam inlet 54.

Reference is now made to Figure 13 as showing one manner of application and use of the engine of the invention. The inlet pipe 54 of the engine is connected to a source of vapor under pressure, such as a steam boiler 25', above atmospheric pressure, for instance four pounds above atmospheric pressure, which is about 19 pounds absolute pressure. This gives the initial downward thrust to the piston 26 of the engine. The second inlet 39 of the engine is connected to a source of high absolute pressure, such as about 12 pounds absolute pressure, from a vaporizer 49' to permit continued downward movement of the piston 26 after the inlet 54 is closed to the top of the cylinder 25.

The outlet 35 of the engine is connected to a source of very low absolute pressure, such as about two pounds obtained from the condenser 30', where the vapors are withdrawn from the engine and condensed by a condenser cooling water circuit 43' ranging around 80° F. which may be wholly or in part wasted through a valve 45' or which may be in whole or in part circulated through a branch pipe 46' and a heater 47' and into the vaporizer 49' from which the overflow returns through a pipe 49ª to the waste pipe 43' as shown. A pipe 50' leads from the condenser 30' back to the boiler 25' by way of the pump 36'. The two inlets 54 and 39 of the engine thus admit steam under pressure by way of inlet 54 and subsequently the vapor at high absolute pressure by way of inlet 39 so that the temperatures of operation of the engine are relatively low. The waste condenser cooling water in pipe 43' is utilized to a high degree for producing the high displacement in the condenser and at the outlet 35 of the engine, and the engine thus effects great economy in operation in a system of this general character.

In view of the above description, and Figure 13 of the drawings of a system in which the engine may be used, it is thought that the following operation of the engine will be more readily understood:

In the operation of the engine a source of relatively low absolute pressure is connected to the exhaust 35 and thus places the interior of the steam chest 36 in the condition of a relatively high absolute pressure. With reference to Figure 1, where the piston 26 is in its upper dead center position, the valve gear is so arranged that at this time the upper openings 41 of the outer valve sleeve or piston 37 are in partial communication with the upper intake port 33 which leads to the top of the cylinder 25. As the upper end of the valve sleeve 37 is open and communicates at all times with the steam chamber 53, the steam entering through the pipe 54 passes through the openings 41, into the annular space between the adjacent packing rings, and through the port 33 to the upper surface of the piston 26.

Figures 3, 4:
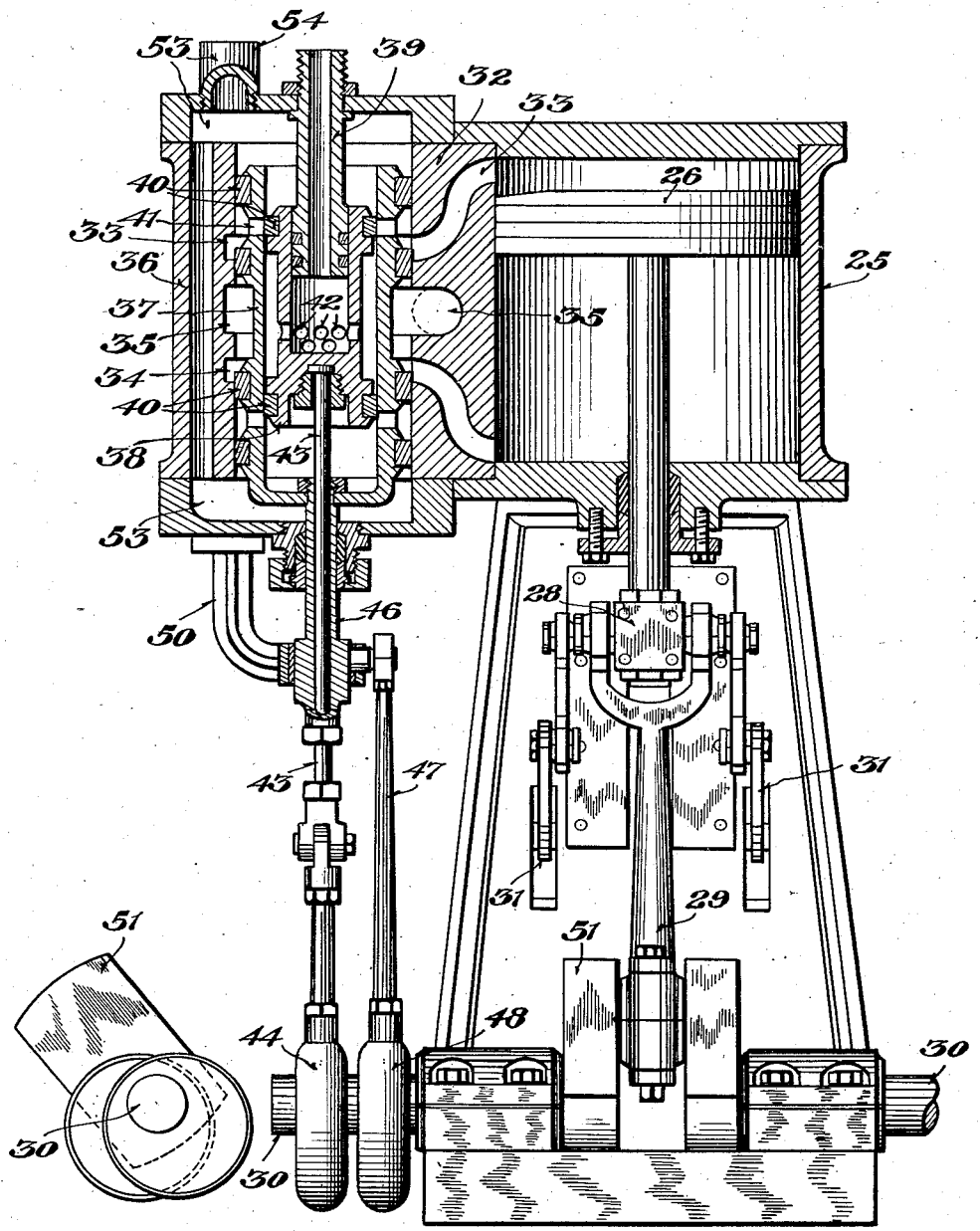
Figure 3 is a view similar to Figure 1 but showing the valve parts in an advanced position with the piston slightly moved down into off center position and wherein the limited steam supply is cut off.
Figure 4 is a detail view similar to Figure 2 but showing the crank and eccentrics in the advanced position of Figure 3.

The piston 26 receives an initial impulse and starts its downward movement. As shown in Figure 3, the piston reaches a second stage of operation wherein the crank 51 swings through a corresponding arc and the valve mechanism is shifted so as to cut off the openings 41 by the intermediate valve sleeve or piston 38. At this time the inlet port 33 is closed by the intermediate valve 38 and the steam in the upper end of the cylinder 25 is permitted to expand for further movement of the piston.

As shown in Figure 5, the next stage of operation of the piston 26 brings the valves into such position that the openings 41 in the outer valve 37 are uncovered by the upper end of the intermediate valve sleeve 38 so as to establish communication between the intermediate annular space of the middle valve 38, its openings 42 and the interior of the inner or fixed piston 39 so that the pressure fluid coming from the vaporizer 49' which, as defined above is less than the high pressure in pipe 54 and greater than the exhaust back pressure in pipe 35, will be delivered through ports 42, 41 and 33 into the cylinder at the upper side of piston and thereby relieve the tendency to produce a vacuum on that side of the piston. Thus it will be seen that the piston will continue its movement due to the differential in pressures between the vaporizer 49' and condenser 30'.

What is claimed is:—

1. A differential pressure engine, comprising a cylinder with a piston therein and a steam chest communicating with the cylinder and having two inlet ports and an exhaust port, valves in the steam chest controlling said intake and exhaust ports, and operating means for the valves for successively opening one intake port to a source of pressure and to the pressure side of the piston in the cylinder to initiate the stroke of the piston and for closing said intake port upon the initial movement of the piston and opening the second intake port to a source of high absolute pressure to prevent the formation of a vacuum at the pressure side of the piston in the cylinder, said operating means also adapted to operate the valves to open the exhaust port and the opposite side of the piston in the cylinder to a source of low absolute pressure to effect movement of the piston due to the differential pressures between the pressure and low absolute pressure sides of the piston.

2. A differential pressure engine, having a cylinder with a piston therein and having a valve chest with two inlet ports and an exhaust port, valves in the steam chest controlling said ports, and valve operating means to successively admit steam under pressure through one inlet port to the cylinder at the pressure side of the piston and to cut off the steam supply after initial movement of the piston and to open the other inlet port to the pressure side of the piston for communication with a source of vapor under high absolute pressure, said valve operating means adapted also to actuate the valves to open the exhaust port to a source of very low absolute pressure to effect a movement of the piston due to the differential pressure between the pressure and low absolute pressure side of the piston.

3. An engine comprising a cylinder having a piston therein and valve mechanism with ports communicating with a source of pressure and with the cylinder adapted for operation to first admit an initial limited quantity of steam to the pressure side of the piston and to cut off the steam supply immediately subsequent to the initial movement of the piston, said valve mechanism further having ports for subsequently opening the cylinder space at the pressure side of the piston to a source of high absolute pressure and having an exhaust port opening to a source to low absolute pressure to effect movement of the piston by differential pressures at opposite sides thereof.

4. An engine comprising a cylinder with a piston therein and a steam chest with intake ports and an exhaust port, and valves in the steam chest controlling said ports for first admitting through one intake port a limited volume of steam into the cylinder at the pressure side of the piston and to cut off the flow of steam subsequent to the initial movement of the piston, and for then admitting through another intake port vapor at high absolute pressure to prevent the formation of a vacuum at the pressure side of the piston, said valves also opening said exhaust port to a source of displacement to effect a low absolute pressure at the pressure side of the piston.

5. An engine comprising a cylinder with a piston therein and a steam chest at the side of the piston having fluid distribution ports leading from the steam chest to the opposite ends of the cylinder and an intermediate exhaust port leading from the steam chest to a source of low absolute pressure, valve means mounted in the steam chest for relative operation with the piston to initially admit through one of said fluid distribution ports a restricted quantity of steam to the pressure side of the piston to initially move the same and to subsequently cut off the steam supply upon said initial movement of the piston, said valve means also adapted to open said fluid distribution port to a source of high absolute pressure to prevent the formation of a vacuum at the pressure side of the piston in the cylinder, said valve means further adapted to open said exhaust port to said source of low absolute pressure and effect movement of the piston by differential pressures between the pressure and low absolute pressure sides of the piston.

6. An engine comprising a cylinder and a piston therein, a steam chest at the side of the cylinder having fluid distribution ports leading to the cylinder and an exhaust port adapted for connection with a source of low absolute pressure, a steam inlet port in the steam chest, a high absolute pressure port in the steam chest, valve mechanism in the steam chest for controlling said ports to initially admit a restricted volume of steam from the steam inlet port to the cylinder at the pressure side of the piston and to close said steam inlet port upon the initial movement of the piston and permit full expansion of the steam in the cylinder, said valve mechanism adapted for subsequent operation to open said high absolute pressure port to the pressure side of the piston and offset a vacuum on the piston, said valve mechanism further adapted to open said exhaust port to the source of low absolute pressure to effect movement of the piston by differential pressure between the pressure and low absolute pressure sides of the piston.

7. A high and low differential absolute pressure engine, comprising a cylinder having a piston therein and a crank shaft connected to the piston, a steam chest at the side of the cylinder having fluid distribution ports leading to the opposite ends of the cylinder and having a pressure port and a high absolute pressure port and an exhaust port, said high absolute pressure port comprising an inner valve piston, an outer valve piston fitting in the steam chest and having ports therein, an intermediate valve piston fitting in the outer valve piston and over said inner piston and having ports therein, and connections between the outer and intermediate valve pistons and said crank shaft for relatively operating the valve pistons to register the ports thereof in different combinations for first admitting a limited volume of steam through one of the fluid distribution ports to the cylinder at the pressure side of the piston to initially move the latter and cutting off said supply of steam after said initial movement and for subsequently opening the high absolute pressure port to said fluid distribution port and said cylinder at the pressure side of the piston after the steam supply is closed to prevent formation of a vacuum at the pressure side of the piston.

8. A high and low differential absolute pressure engine, comprising a cylinder with a piston therein and a crank shaft connected to the piston, a steam chest at the side of the cylinder having fluid distribution ports leading to the opposite ends of the cylinder and having an exhaust port adapted for connection with a source of low absolute pressure, an outer valve piston mounted in the steam chest and having eccentric connections with the crank shaft and having openings therethrough for cooperation with the fluid distribution ports leading to the cylinder and having packing rings at opposite sides of the openings, a second valve piston slidably mounted in the first valve piston and having openings therein and an eccentric connection with said crank shaft for operation thereby relative to the cylinder piston and the outer valve piston, a hollow inner piston fixed in one end of the steam chest and having an interior connection for a source of high absolute pressure and slidably sealed in the adjacent end of the inner slidable valve piston and having openings therethrough communicating with the interior of the second valve piston and having sealing rings thereon for controlling the ports of the second valve piston, and a fluid pressure supply pipe connected to the steam chest, said valves adapted for relative operation to initially admit a restricted volume of fluid under pressure to the cylinder at the pressure side of the piston and cut off the fluid under pressure after the initial movement of the cylinder piston and upon further operation to open the inner fixed valve piston to the cylinder at the pressure side of the piston to prevent formation of a vacuum at said pressure side of the piston.

VINCEN P. McVOY.